Feb. 21, 1950     H. N. DIMICK     2,498,256
INTERMITTENTLY OPERATED VACUUM HORN
Filed July 24, 1945     2 Sheets-Sheet 1
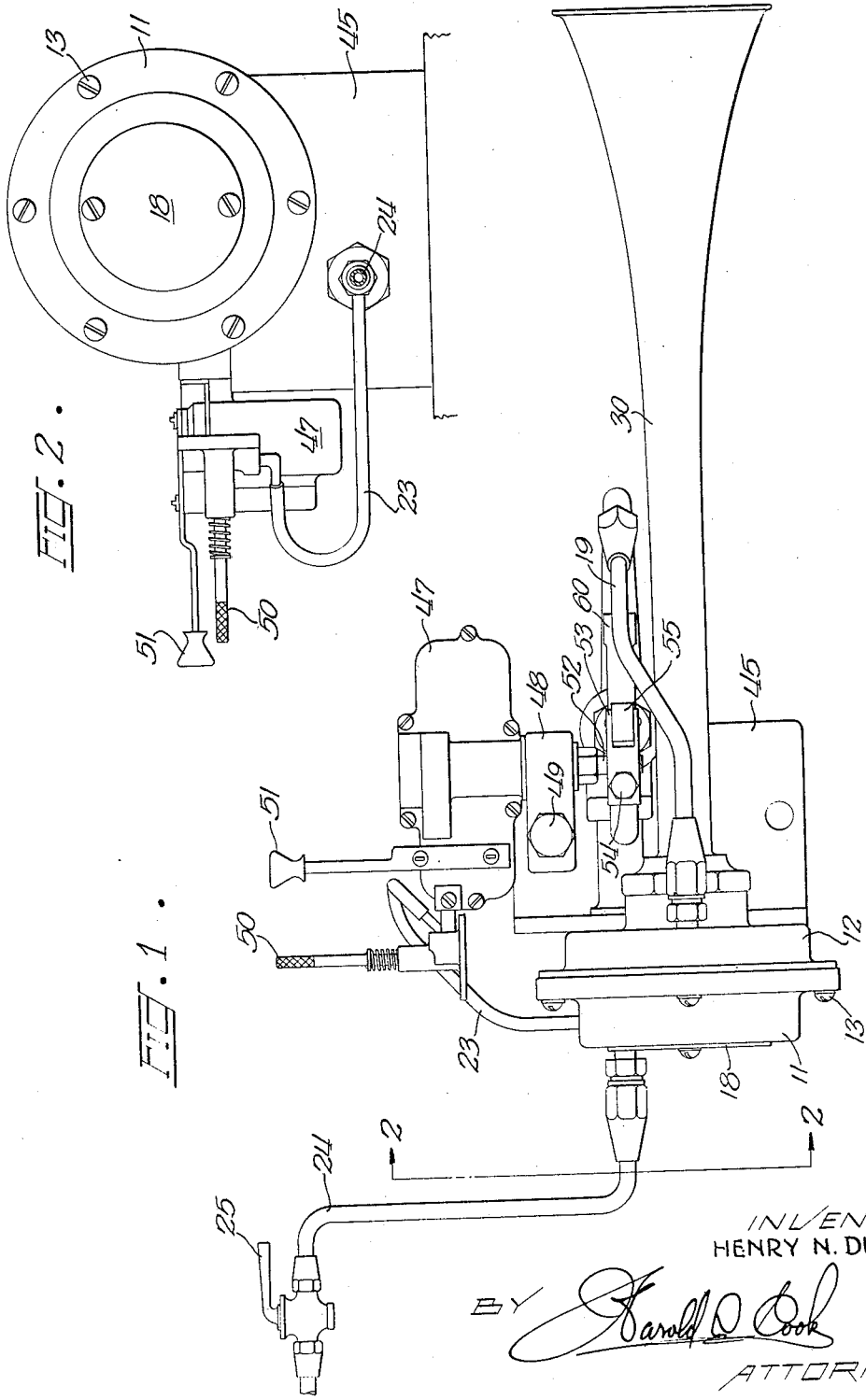
INVENTOR
HENRY N. DIMICK
BY Harold D. Cook
ATTORNEY Feb. 21, 1950            H. N. DIMICK            2,498,256
INTERMITTENTLY OPERATED VACUUM HORN
Filed July 24, 1945            2 Sheets-Sheet 2
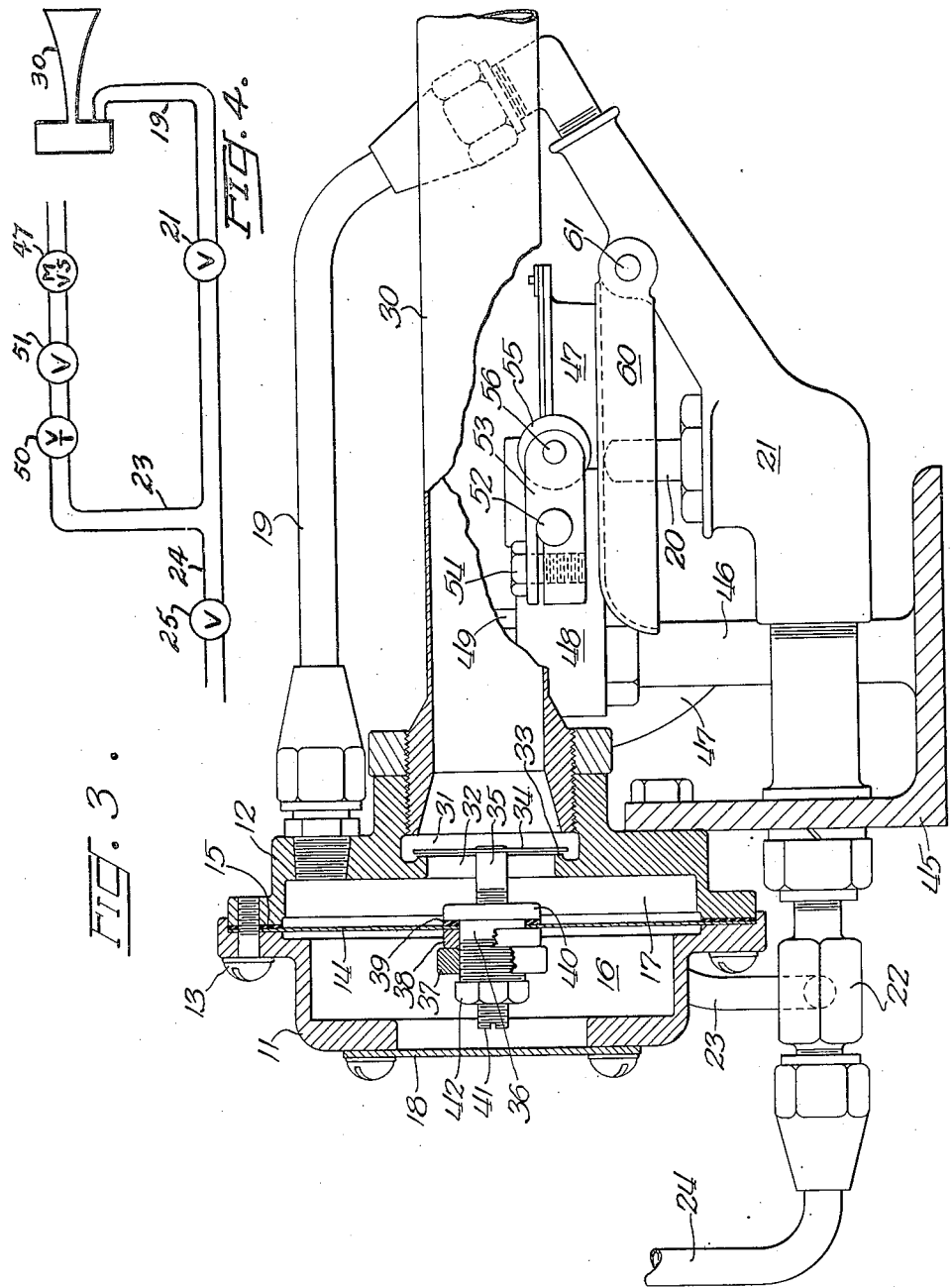
INVENTOR
HENRY N. DIMICK
BY    Harold D. Cole
ATTORNEY Patented Feb. 21, 1950

2,498,256

UNITED STATES PATENT OFFICE 2,498,256

INTERMITTENTLY OPERATED VACUUM HORN

Henry N. Dimick, Portland, Oreg., assignor to Hyster Company, Portland, Oreg., a corporation of Oregon Application July 24, 1945, Serial No. 606,785

5 Claims. (Cl. 116—22)

This invention relates to a novel vacuum horn for producing an audible warning signal.

The general object of the invention is to provide a vacuum horn for vehicles, and the like, which does not employ delicate parts or mechanisms requiring frequent adjustment or replacement, which is rugged and reliable in operation, and which will produce a loud warning signal. A further object is to provide a horn of the type described having associated therewith a simple and inexpensive mechanism for automatically producing periodic or intermittent operation of the horn.

With these and other objects in view, the invention resides in the construction and arrangement of parts shown in the accompanying drawings illustrating a preferred embodiment of the invention.

Figure 1 is a top plan view of a vacuum horn embodying the principles of the present invention, Figure 2 is a view taken on the line 2—2 of Figure 1, showing the horn in rear elevation, and Figure 3 is an enlarged longitudinal sectional view.

Figure 4 is a diagram showing the connections between the different components of the assembly.

The present horn is a warning device of general application that is intended primarily for use on vehicles such as straddle trucks in lumber yards. These trucks constitute a particularly serious hazard to workmen handling lumber because the driver of the truck is perched high in the air where his view of immediate surroundings is obstructed by the load carried under the truck. For the safety of the other workmen it has been found necessary to provide such trucks with a warning device which operates automatically when the truck is in use. The present horn is operated entirely by a vacuum line connected with the intake manifold of the engine of the truck and is provided with an on and off valve in the cab of the truck. The operator of the truck can thereby turn the valve so that the horn will continue to operate while the truck is in use.

Associated with the horn on a common mounting bracket is a vacuum motor connected with the horn vacuum line and arranged to open and close a valve periodically connecting the vacuum line with the horn. By means of this unitary mechanism, an intermittent signal is produced in which the sounding intervals may be varied by adjusting the speed of the motor. Thus the horn may automatically be blown at sufficiently frequent intervals adequately to warn all workmen in the vicinity without creating the annoyance of a constant, uninterrupted sound. The present horn is also obviously applicable to any installation where an automatic intermittent warning is desired. If such installation does not have a source of vacuum available, a motor driven vacuum pump, or the like, may be included in or connected with the device.

The horn itself comprises, in general, a pair of circular, mating housing parts 11 and 12 secured together by marginal screws 13 which also serve to clamp a diaphragm 14 and gasket 15 between the parts. The housing parts 11 and 12 thereby form air chambers 16 and 17 on opposite sides of the diaphragm. The chamber 16 contains air under atmospheric pressure at all times but is protectively covered by a removable inspection plate 18 which need not make an air tight connection with the housing part 11. Communicating with the chamber 17 is a vacuum line 19 controlled by a valve plunger 20 in a valve 21. The valve 21 is in turn connected with a fitting 22 establishing communication with a branch pipe 23 and a line 24 leading to an engine intake manifold or other source of vacuum. A valve 25 in this line is mounted in the truck cab for the use of the driver.

The housing part 12 carries a horn tube 30 in axial alignment with an annular recess 31 and a circular opening 32 in the chamber 17. Around the margin of the opening 32 is a raised annular face 33 adapted to seat a reciprocating disc 34. The disc 34 is fixed on one end of a spindle 35 screwed into a diaphragm bushing 36 mounted on the diaphragm 14, and a nut 37 on the bushing clamps the diaphragm tightly between a spacer 38 and a gasket 39 bearing against an enlarged head 40 on the bushing. The disc 34 may be adjusted longitudinally with respect to the face 33 by means of a screwdriver slot 41 in the spindle 35, such adjustment being maintained by means of lock nut 42. The disc 34 is preferably adjusted to have a light contact with the face 33 when the system is open to atmospheric pressure on both sides of the diaphragm, so as to allow for vibration in both directions from a mid position.

When atmospheric pressure exists in the chambers 16 and 17, the parts assume the position shown in Figure 3. When the valves 21 and 25 are opened, the pressure is reduced in chamber 17 causing the diaphragm 14 and the disc 34 to move to the right under the force of atmospheric pressure in chamber 16. Upon a slight movement of the disc 34 to the right, air will enter the chamber 17 through the opening 32 faster than it can leave by way of the pipes 19 and 24 and the pressure in chamber 17 will rapidly build up, returning the diaphragm and the disc 34 to their original positions shown in Figure 3. The rapid repetition of this cycle produces a musical note in the horn 30.

A bracket 45 is provided for mounting the horn and the valve 21. The bracket 45 also carries a post 46 for mounting a pneumatic motor 47 to produce intermittent operation of the horn. In the present embodiment the pneumatic motor 47 consists of a conventional windshield wiper vacuum motor secured to the post 46 by means of a clamp 48 and a screw 49. This motor is connected with the vacuum line 24 by means of the pipe 23 and is provided with the usual speed control valve 50 and a shut-off valve 51. For the present purpose the shut-off valve 51 is left permanently on and the speed control valve 50 is adjusted to produce the desired frequency of sounding intervals.

The numeral 52 indicates the oscillating shaft of the motor 47 to which the windshield wiper arm would ordinarily be attached. In the present arrangement, the shaft 52 carries an arm 53 clamped thereon by means of a clamp screw 54 and carrying a cam roller 55 mounted on a pin 56 in a roller slot in the end of the arm. Mounted in the path of the cam roller 55 and bearing upon the valve plunger 20 is a channel shaped cam follower 60 pivoted at 61 to the valve housing 21. The motor 47 thereby produces continuous oscillation of the cam arm 53 through an arc of 180° or less to depress the valve plunger 20 and sound the horn on each stroke of the cam, the duration of each sounding interval being determined in part by the speed of oscillation of the motor and in part by the position at which the arm 53 is clamped on the motor shaft. If desired, the motor may be shut off at the valve 51 when the cam is in a position to hold the valve plunger 20 depressed, to cause the horn to emit a continuous instead of an intermittent sound. The valve 51 also may be closed when the cam is raised as in Figure 3 to prevent mischievous operation of the horn by unauthorized persons.

Figure 4 shows the connections between the different components of the assembly. When valve 25 is opened, the partial vacuum condition in the engine manifold draws a partial vacuum in the main pipe line 24 and also in the branch line 23. When the horn valve 21 is opened, atmospheric air is drawn through horn tube 30 and pipe 19 to vibrate the horn diaphragm in the manner described. When shut-off valve 51 is opened, the partial vacuum condition in line 23 is communicated to the variable speed pneumatic motor 47 to oscillate the cam arm 53. The valve 51 is preferably a quick opening and quick closing slide valve, so that it may be operated to stop the pneumatic motor 47 instantly to leave the cam arm 53 in a particular position. Thus the valve plunger 20 may be held depressed so that the horn 30 will sound with a steady tone instead of an intermittent tone whenever the valve 25 in the cab of the truck is opened.

Valve 50 is preferably a slow acting needle valve to serve as a throttle or speed control valve for the pneumatic motor 47. Thus the valve 50 provides for adjustment of the frequency of the sounding interval, which adjustment is not disturbed by operating either of the manual shut-off valves 25 or 51. It is understood, of course, that the pneumatic motor 47 operates under atmospheric pressure, exhausting through the pipes 23 and 24 into the engine intake manifold in the manner of the ordinary windshield wiper motor.

Various changes in the construction and arrangement of parts will occur to persons skilled in the art, and all such modifications are included in the invention, the same being limited only by the scope of the appended claims.

Having now described my invention and in what manner the same may be used, what I claim as new and desire to protect by Letters Patent is:

1. In an intermittent vacuum horn, a mounting bracket, a vacuum line connection mounted on said bracket, a valve mounted on said bracket in communication with said vacuum line connection, a vacuum motor producing oscillatory motion mounted on said bracket, a vacuum line from said vacuum connection to said motor, a vacuum line from said valve for connection with said horn, and means operated by said motor to intermittently open and close said valve.

2. In a vacuum horn, a mounting bracket, a valve mounted on said bracket, a vacuum line from said valve for connection with said horn, a plunger for opening and closing said valve, an oscillating shaft vacuum motor mounted on said bracket, valve means for controlling said motor, a cam driven by said motor, and a lever pivoted on said valve and bearing upon said plunger in the path of said cam to constitute a cam follower for operating said valve in accordance with the movements of the cam.

3. In an intermittent vacuum horn, a mounting bracket, a valve mechanism mounted on said bracket for controlling said horn, a variable speed oscillating shaft vacuum motor mounted on said bracket, means operated by said motor for periodically opening and closing said valve, and valve means to vary the speed of said motor to control the sounding interval of said horn.

4. In an intermittent vacuum horn, a valve for controlling the sounding of said horn, a vacuum motor for operating said valve intermittently, means to adjust the speed of said motor to vary the frequency of sounding intervals, an oscillating arm driven by said motor and arranged to open said valve at each stroke thereof, and means to adjust the position of said arm with respect to said motor and said valve to vary the duration of the sounding intervals.

5. In an intermittent vacuum horn, a valve for controlling the sounding of said horn, a vacuum motor having an oscillating shaft, an arm for actuating said valve intermittently, means for securing said arm on said motor shaft in adjusted position to control the duration of each sounding interval, and means to adjust the speed of said motor to vary the frequency of sounding intervals.

HENRY N. DIMICK.

REFERENCES CITED

The following references are of record in the file of this patent:

UNITED STATES PATENTS

| Number | Name | Date |
|---|---|---|
| 1,046,164 | Fanning | Dec. 3, 1912 |
| 1,419,435 | Woodring | June 13, 1922 |
| 1,786,214 | McCune et al. | Dec. 23, 1930 |
| 1,888,684 | Middleton | Nov. 22, 1932 |
| 1,943,671 | Hewitt et al. | Jan. 16, 1934 |
| 2,038,847 | Morrow | Apr. 28, 1936 |